United States Patent
Longo et al.

(10) Patent No.: US 9,944,871 B2
(45) Date of Patent: Apr. 17, 2018

(54) METHOD AND SYSTEM FOR PRODUCTION OF BIODIESEL UTILIZING ULTRASONIC SHEAR MIXING TO REDUCE THE AMOUNT OF ENERGY NEEDED BY 45 TO 50% AND ELIMINATE THE USE OF WATER

(75) Inventors: Jeffrey Longo, Jupiter, FL (US); Jan Goodman, Tequesta, FL (US)

(73) Assignee: Genuine Bio-Fuel, Inc., Indiantown, FL (US)

(*) Notice: Subject to any disclaimer, the term of this patent is extended or adjusted under 35 U.S.C. 154(b) by 798 days.

(21) Appl. No.: 13/554,454

(22) Filed: Jul. 20, 2012

(65) Prior Publication Data

US 2013/0019521 A1    Jan. 24, 2013

Related U.S. Application Data

(60) Provisional application No. 61/509,815, filed on Jul. 20, 2011.

(51) Int. Cl.
*C10L 1/00* (2006.01)
*C10L 1/19* (2006.01)
(Continued)

(52) U.S. Cl.
CPC .............. *C10L 1/19* (2013.01); *C10L 1/026* (2013.01); *C11C 1/08* (2013.01); *C11C 3/10* (2013.01);
(Continued)

(58) Field of Classification Search
CPC .... C10L 1/026; C10L 1/19; C10L 2200/0476; C10L 2270/026; C10L 2290/34;
(Continued)

(56) References Cited

U.S. PATENT DOCUMENTS 6,015,440 A * 1/2000 Noureddini ............. C10L 1/026
                                                              44/388
6,440,057 B1   8/2002 Ergun et al.
(Continued)

FOREIGN PATENT DOCUMENTS

CN    200510026480 A    6/2005
CN    200610029458 A    7/2006
(Continued)

OTHER PUBLICATIONS

English Translation CN 201280541 Y.*
Kotrba, R., "Ultrasonic biodiesel processing", Biodiesel Magazine, p. 20-25, USA, (Jun. 2010).

*Primary Examiner* — Latosha Hines
(74) *Attorney, Agent, or Firm* — McHale & Slavin, P.A.

(57) ABSTRACT

The instant invention describes a method and system for producing biodiesel which increases energy efficiency by reducing the overall amount of energy associated with producing the biodiesel. Unlike most systems which use a batch procedure, the instant method and system utilize a continuous flow sonification procedure which provides for reactions to take place in tubes as the biodiesel moves along through the process. The continuous flow sonification procedure is performed in two main stages, utilizing the steps of acid esterification, transesterification, and a waterless washing.

10 Claims, 2 Drawing Sheets

(51) Int. Cl.
*C10L 1/02* (2006.01)
*C11C 1/08* (2006.01)
*C11C 3/10* (2006.01)

(52) U.S. Cl.
CPC . *C10L 2200/0476* (2013.01); *C10L 2270/026* (2013.01); *C10L 2290/34* (2013.01); *C10L 2290/44* (2013.01); *Y02E 50/13* (2013.01)

(58) Field of Classification Search
CPC .......... C10L 2290/44; C11C 1/08; C11C 3/10; Y02E 50/13
USPC .................................. 44/307; 422/128, 187
See application file for complete search history.

(56) References Cited

U.S. PATENT DOCUMENTS

| | | |
|---|---|---|
| 6,884,900 B2 | 4/2005 | Maeda et al. |
| 7,754,905 B2 | 7/2010 | Kozyuk |
| 2005/0027137 A1 | 2/2005 | Hooker |
| 2005/0204612 A1* | 9/2005 | Connemann ............ C07C 67/03 44/437 |
| 2007/0199238 A1 | 8/2007 | Hooker |
| 2008/0110082 A1 | 5/2008 | Maliszewski et al. |
| 2008/0184616 A1 | 8/2008 | Misra et al. |
| 2008/0202021 A1 | 8/2008 | Powell |
| 2008/0220515 A1 | 9/2008 | McCall |
| 2008/0244965 A1 | 10/2008 | Tarbet |
| 2008/0250700 A1 | 10/2008 | Tremblay et al. |
| 2008/0268302 A1 | 10/2008 | McCall |
| 2008/0269513 A1 | 10/2008 | Sarangan et al. |
| 2008/0312460 A1 | 12/2008 | Goodson |
| 2009/0000941 A1* | 1/2009 | Kropf ...................... 204/157.62 |
| 2009/0107034 A1 | 4/2009 | Fukunaga |
| 2009/0181438 A1 | 7/2009 | Sayre |
| 2009/0223612 A1 | 9/2009 | McKnight et al. |
| 2009/0292133 A1 | 11/2009 | Wakamatsu |
| 2009/0305356 A1 | 12/2009 | Poniatowski et al. |
| 2009/0314688 A1 | 12/2009 | Gordon et al. |
| 2010/0037513 A1 | 2/2010 | Petrucci et al. |
| 2010/0048941 A1 | 2/2010 | Kapicak et al. |
| 2010/0063309 A1 | 3/2010 | Bunning et al. |
| 2010/0126060 A1 | 5/2010 | Maliszewski et al. |
| 2010/0151540 A1 | 6/2010 | Gordon et al. |
| 2010/0163402 A1 | 7/2010 | Seo |
| 2010/0175309 A1 | 7/2010 | Kozyuk et al. |
| 2010/0175986 A1 | 7/2010 | Dekhtiaruk et al. |
| 2010/0196994 A1 | 8/2010 | van Leeuwen et al. |
| 2010/0218734 A1 | 9/2010 | Sugioka et al. |
| 2010/0242346 A1 | 9/2010 | Bunning et al. |
| 2010/0281761 A1 | 11/2010 | Rey |
| 2010/0286436 A1 | 11/2010 | Koudil et al. |

FOREIGN PATENT DOCUMENTS

| | | |
|---|---|---|
| CN | 200610104789 A | 10/2006 |
| CN | 200820010102 U | 1/2008 |
| CN | 200810017131 A | 6/2008 |
| CN | 200820081793 U | 10/2008 |
| CN | 200810218887 A | 11/2008 |
| CN | 200810228605 A | 11/2008 |
| CN | 200910045652 A | 1/2009 |
| CN | 201280541 Y * | 7/2009 |
| CN | 200910019387 A | 10/2009 |
| CN | 201010137300 A | 4/2010 |
| EP | 1975393 | 10/2008 |
| EP | 2106853 | 1/2009 |
| EP | 2042589 | 4/2009 |
| TW | 2005110647 A | 4/2005 |
| WO | WO2007077302 | 7/2007 |
| WO | WO2007127059 | 11/2007 |
| WO | WO138285 | 12/2007 |
| WO | WO2009003109 | 12/2008 |
| WO | WO2009154437 | 12/2009 |

* cited by examiner

METHOD AND SYSTEM FOR PRODUCTION OF BIODIESEL UTILIZING ULTRASONIC SHEAR MIXING TO REDUCE THE AMOUNT OF ENERGY NEEDED BY 45 TO 50% AND ELIMINATE THE USE OF WATER

CROSS REFERENCE TO RELATED APPLICATIONS

The present invention claims priority under 35 U.S.C. § 119(e) to U.S. Provisional Patent Application No. 61/509,815, filed on Jul. 20, 2011, the contents of which are herein incorporated by reference in its entirety.

FIELD OF THE INVENTION

The instant invention relates to methods and systems for manufacturing and producing fuels; and more particularly, to methods and systems for manufacturing and producing biodiesel fuels in a manner which reduces the amount of energy needed to produce such fuels.

BACKGROUND OF THE INVENTION

Over the last decade, petroleum-based fuel prices in the United States have steadily risen. It is estimated that the price for petroleum-based fuel will continue to rise, with the average price in the range of 5 to 6 dollars per gallon as the norm. Several reasons have been cited for the increasingly high prices seen at the gas pump. The United States continues to be one of the world's largest users of petroleum-based fuel. It is estimated the U.S. uses 18-20 million barrels of crude oil a day. As other countries, such as China and India, become more industrialized, they compete with the United States. Competition for such limited resources results in increasing prices. Despite international competition for petroleum-based fuel increases, the U.S. has steadily decreased its domestic production, creating a dependency on foreign oil sources. About half of the petroleum-based fuel purchased by the United States now comes from foreign sources. Such dependence on foreign oil provides ample opportunity for fluctuations in price. Moreover, given the fact that some of the foreign oil originates from the Middle East where governments may not be stable or friendly to the United States, social occurrences and influence over oil cartels are beyond the control of the Unties States, thereby presenting opportunity for increasing energy costs.

Exploring and drilling for new sources of domestic oil may be a mechanism to reduce the country's dependence on foreign oil sources. However, recent environmental disasters, such as the 2010 oil spill in the Gulf of Mexico, may prevent, or at least reduce, the likelihood of exploring for and drilling new oil wells. In addition to rising gas prices, environmental concerns regarding the use of fossil fuels, i.e. increased levels of carbon dioxide emissions believed to contribute to the global warming phenomenon, have contributed to increased efforts for the development of alternative petroleum-based fuel sources. As environmental groups pressure Congress to eliminate or reduce the dependence on unclean fuels, the price of petroleum-based fuel is expected to rise.

Given the environmental factors and economic realities of petroleum-based fuel usage, alternative fuels sources have been developed. One such alternative fuel is biofuels, such as biodiesel. Biodiesel is one of the fastest growing alternative sources in the country. Biodiesel is a domestically produced, renewable fuel that can be manufactured from new or used vegetable oils, animal fats, and restaurant oils. The use of biodiesel, in conventional diesel engines has been shown to substantially reduce emissions of pollutants such as all green house gasses when compared to use of petroleum-based fuels up to 86%. Air contaminants reduced include unburned hydrocarbons, carbon monoxide, sulfates, polycyclic aromatics hydrocarbons, nitrated polycyclic aromatic hydrocarbons, and particulate matter. The carbon dioxide released in biodiesel combustion is offset by the carbon dioxide sequestered while growing the feedstock from which biodiesel is produced. Biodiesel is safe to handle and transport due to its biodegradability and non-toxic nature. If released to the environment, biodiesels degrade almost four times faster than petroleum-based fuels. Biodiesels have similar physical properties as petroleum-based fuels, and therefore, can be blended with diesel fuel in any proportions, such as B20 which is a commercial blend of fuel containing 20% biodiesel and 80% petroleum-based diesel. Biodiesel can have a great environmental and economical impact as a partial substitute for petroleum-based fuels. By being blended into current petroleum-based mixtures, reduction of the amount of diesel fuel used daily can be accomplished. While biodiesel is a renewable source, obtaining enough of it to be a direct fossil-fuel replacement is unrealistic at this time. Improvements to the processing of biodiesel may be important for public usage and ultimate commercial success.

Developing better systems for producing biodiesel, such as reducing the total amount of energy it takes to produce a gallon, is of primary importance if such a fuel is to become an important alternative to petroleum-based fuels.

DESCRIPTION OF THE PRIOR ART

Various methods of providing biodiesels are known in the art. Biodiesel is generally produced by a process known as transesterification. In the transesterification process, an alcohol is reacted with the triglycerides contained in the vegetable oils/animal fats/grease to form fatty acid alkyl esters, which makes up biodiesel, and a by-product, glycerin. The reaction further requires heat and use of a strong base catalyst.

SUMMARY OF THE INVENTION

The instant invention describes a method and system for producing biodiesel which increases energy efficiency by reducing the overall amount of energy associated with producing the biodiesel. Unlike the current systems which use a batch procedure, in which the oil precursor is mixed with a catalyst and alcohol and allowed to react in large reacting tanks, the instant method and system utilize a continuous flow sonification procedure which provides for reactions to take place in tubes as the biodiesel moves along through the process. As one gallon is put into the continuous flow system, one gallon is produced. The continuous flow sonification procedure is performed in several main stages, utilizing the steps of acid esterification, transesterification, and a waterless washing. While the method of producing biodiesel uses common chemical stoichiometry, it is produced using half the energy consumption as standard procedures.

The continuous flow sonification procedure can be used as a stand alone system or can be designed in multi-stage applications. Accordingly, new plants do not need to be constructed as existing facilities can be retro-fit to bring those facilities up to systems with high levels of efficiency.

According to current GEET (Global Environmental Energy Technology) lifecycle analysis, the National Biodiesel Board and the U.S. Department of Agriculture state that, based on national surveys, the average amount of energy used in the production of biodiesel is 4,192 BTU. Even using new oil sources, such as virgin oils, it is shown that approximately 3,184 BTUs are needed to produce a gallon of biodiesel. The amount of energy required to produce a gallon of biodiesel using the method and system in accordance with the instant invention is approximately 2,000 BTUs, a reduction of over 50% when compared to the national averages. Additionally, the method and system uses low pressure, low temperature, and no open flames, thereby providing a much safer design than currently used systems.

Accordingly, it is an objective of the instant invention to teach a method and system for producing biodiesel which increases energy efficiency by reducing the overall amount of energy associated with producing the biodiesel.

It is a further objective of the instant invention to teach a method and system for producing biodiesel which utilizes ultrasonic shear mixing to increase energy efficiency by reducing the overall amount of energy needed to produce the biodiesel.

It is yet another objective of the instant invention to teach a method and system for producing biodiesel which utilizes ultrasonic shear mixing and which reduces the amount of energy needed to produce the end product by up to 50% over conventional biodiesel production processes.

It is a still further objective of the instant invention to teach a method and system for producing biodiesel which eliminates the use of water in purifying the biodiesel produced.

It is yet another objective of the instant invention to teach a method and system for producing biodiesel utilizing ultrasonic shear mixing which reduces the amount of energy needed to produce the end product by 50% over conventional biodiesel production processes and which eliminates the use of water in the final purification steps.

It is a still further objective of the instant invention to teach a method and system for producing biodiesel which minimizes the risk of electrical hazards.

It is yet another objective of the instant invention to teach a low pressure, low temperature method and system for producing biodiesel.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
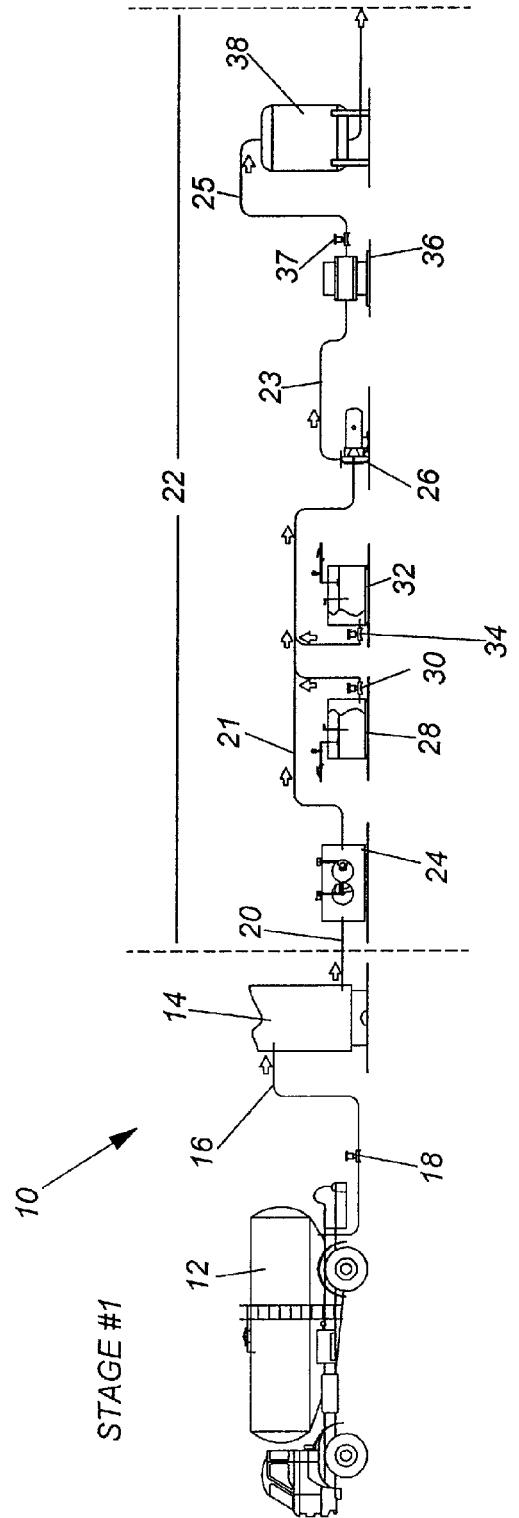
FIG. 1 is a schematic flow chart of the first stage of the biodiesel producing process and system in accordance with the instant invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

The instant invention describes a method and system for producing biodiesel using a continuous, multi-step process. The overall method for producing such biodiesel can be performed generally in several stages. The combination of equipment and the method are used to manufacture ASTM International grade biodiesel or any alkyl methyl ester/FAME or alkyl ethyl ester from fatty acids. The method exemplified uses fatty acids from vegetable oils, animal oils, fish oils, plant oils, and fats, but can be adapted to produce biodiesels using other sources of fatty acids as well. In addition, the method can be used to convert algae oil feedstock and/or algae lipids into biodiesel. The combination of equipment and the method increases the energy efficiency of the overall production process by reducing the energy levels needed to produce the high quality biodiesel and reduces the GEET lifecycle analysis model for biodiesel production. It is further estimated that the method according to the instant invention can reduce the energy needed to produce each gallon by up to fifty percent (50%).

The chemical reactions for carrying out the production of biodiesel are well known and have been described previously. Briefly, production of alkyl esters from fatty acids is achieved by transesterification of vegetable or animal fats or oils. The transesterification process involves reacting triglycerides with an alcohol in the presence of a catalyst. For some fats having high levels of free fatty acids, pre-treatment reactions with alcohol in the presence of acids is required (esterification). The chemical reactions and stoichiometric chemical balances used in manufacturing biodiesel according to the instant invention do not differ from standard industry practices. While the method described herein uses standard chemistry, the method and system has resulted in the unexpected achievement of manufacturing standard, ASTM grade biodiesel using up to about 50% less energy as compared to other methods.

Figure 2:
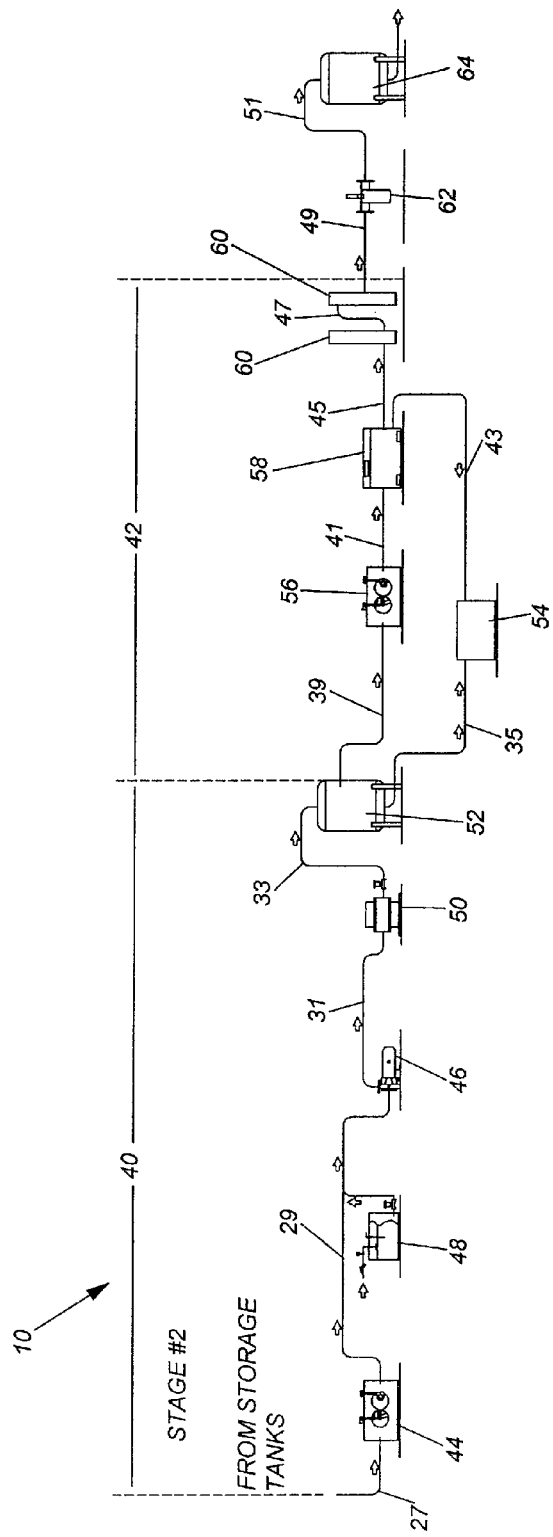
FIG. 2 is a schematic flow chart of the second stage of the biodiesel producing process and system in accordance with the instant invention.

Referring to FIGS. 1 and 2, the method and system for producing biodiesel which utilizes ultrasonic shear mixing to increase energy efficiency by reducing the overall amount of energy needed to produce the biodiesel is illustrated as a three step-process shown in two stages. The system, generally referred to as 10, produces ASTM grade biodiesel through the steps of 1) acid esterification, 2) transesterification, and 3) waterless washing purification. Typical sources of the fatty acids are derived from vegetable oils, animal fats, and/or grease from restaurants. Referring specifically to FIG. 1, such oils can be obtained from independent sources and delivered to the system 10 through delivery vehicles, such as trucks 12. The vegetable/animal oil or fats and grease solution, collectively referred to as the pre-cursor biodiesel feedstock, is offloaded from the truck 12 to a holding tank 14 through the use of piping 16 and valves 18. The holding tank 14 is fluidly connected to the rest of the system 10 through pipes 20. The pre-cursor biodiesel feedstock is allowed to remain in the holding tank 14 for a pre-determined time period to allow any solid particles which may be mixed within to settle out and rest at the bottom. Accordingly, several holding tanks 14 (not illustrated) may be utilized to ensure that one or more sources of pre-cursor biodiesel feedstock can be fed into the system while newly delivered pre-cursor biodiesel feedstock has time to allow for solid particle separation.

Once all solids from within the pre-cursor biodiesel feedstock has had the necessary time to separate out, the liquid solution is fed into system 10. The first step 22 of the method involves acid esterification. The acid esterification steps allow the system 10 to accept a wide scope of oils, ranging from virgin oil solutions having low, i.e. less than 3% free fatty acids (FFA) to high FFA, i.e. greater than 3%, solutions. The system even allows for processing of animal oils and fats and other solutions that are not clean, such as restaurant grease. As the pre-cursor biodiesel feedstock is fed from the holding tank 14 to the acid esterification steps, it is heated to a required reaction temperature range of about 50 degrees Celsius to 65 degrees Celsius. In the preferred embodiment, the heating process is done via direct heating using, for example, a military surplus M-80 hot water furnace 24. The hot water furnace 24 is generally a self-contained unit, except for the fuel tank. Preferably, the furnace uses biodiesel as a fuel source, and is designed to consume less than 2 gallons per hour, or about 10 gallons per 8 hour shift. Use of the hot water furnace has been found to be more energy efficient than use of electric or a water heat exchanger.

The heated pre-cursor biodiesel feedstock is further moved through the system 10 via pipes 21 through a gallon totalizer meter toward pump 26. As the pre-cursor biodiesel feedstock moves through the system, it is reacted with alcohol, such as methanol, in the presence of a strong acid, such as sulfuric acid. As illustrated in FIG. 1, the acid, which is stored in an acid tank 28, is pumped into the pipes 21 through use injection point 30 and controlled by the pump speed. Additionally, methanol, or other suitable alcohols known to one of skill in the art, which is stored in an alcohol tank 32, is pumped into pipe 21. The flow of alcohol can be controlled by the pump speed. The methanol and sulfuric acid are injected in the suction side, or up-stream of the pump, in order to minimize or eliminate pressure on the injection points for safety.

Pump 26 is preferably a pneumatic pump in order to reduce the amount of energy used during the process. To keep starting load and amperage down, a screw compressor is preferably used. Use of a screw compressor also reduces maintenance costs. The pump 26 feeds pre-cursor biodiesel feedstock through pipe 23 to a sonochemical mixer 36, such as an ultrasonic mixer. The fluid output is restricted through use of a valve 37 to a constant, low pressure of 2 to 3 atmospheres. Preferably, the sonochemical mixer 36 is used at a single frequency, and at power levels greater than 20 W/cm$^2$, preferably up to 200 W/cm$^2$ or greater. The pre-cursor biodiesel feedstock is placed into stage 1 storage tank 38 by way of pipe 25 for a time period, typically 8-12 hours, which is long enough for the reaction to be complete. The system 10 may include several stage 1 storage tanks 38 (not illustrated) in order to allow the process to continuously run. As new pre-cursor biodiesel feedstock is placed in the stage 1 storage tanks 38, those that have completed the reaction time can be used for further processing. Once the reaction is allowed to run its course, free fatty acids will be broken down to levels of 2.5% or less of the pre-cursor biodiesel feedstock. No soaps, waste, or co-products are produced at this stage. All resulting product moves on to the transesterification process.

FIG. 2 illustrates the second stage of the method and system for producing biodiesel which utilizes ultrasonic shear mixing to increase energy efficiency by reducing the overall amount of energy needed to produce the biodiesel. The second stage contains the transesterification process 40 and a waterless wash stage 42. From one of the stage 1 storage tanks 38 which has had the proper amount of time for complete reaction to occur, the pre-cursor biodiesel feedstock is pumped into a smaller heating reservoir 44 via pipe 27. Pumping the solution into reservoir 44 brings the solution back to a temperature of between 50 degrees Celsius and 65 degrees Celsius. In order to prevent any methanol from evaporating, the temperature of the solution must not reach above 68 degrees Celsius. As the solution is moved towards pump 46, a catalyst, stored in catalyst tank 48, is injected into pipe 29. The catalyst, including but not limited to sodium hydroxide or potassium hydroxide methylate, or other catalysts known to one of skill in the arts, is injected on the suction side, or up-stream of the pump, for safety reasons. The solution is pumped into a second sonochemical mixer 50, such as an ultrasonic mixer, through pipes 31. As described previously, the output of the sonochemical mixer 50 is restricted to preferably 2 to 3 atmospheres in order to bring the power level to greater than 20 W/cm$^2$, preferably up to 200 W/cm$^2$ or greater. The solution is transferred to a stage 2 tank 52 via pipe 33. The solution is allowed to remain in the stage 2 tank 52 to finish the reaction process. Once the reaction is complete, glycerin, a co-product, falls out of solution. The glycerin is pulled out of the stage 2 tank 52 and allowed to collect in a glycerin storage tank 54 through pipe 35.

Floating top suction is established and used to continually pull off the biodiesel from the top of the stage 2 tank 52 and further processed through a waterless wash stage 42. The pre-cursor biodiesel feedstock is moved from the stage 2 tank 52 to a separating unit through pipes 39 and 41 to separate the soap/glycerin by-products that have formed and not previously been removed. Temperatures in the range of 100 to 140 degrees Fahrenheit should be sufficient for separation. As the pre-cursor biodiesel feedstock moves downstream, it may be heated to the necessary temperature through use of a smaller heating reservoir 56. The pre-cursor biodiesel feedstock is transferred through a centrifuge 58. By-products, such as the soaps/glycerin, are transferred to the glycerin storage tank 54 via pipes 43. Once centrifugation has been completed, the alkaline biodiesel must be neutralized and is transferred to ion exchange units 60 trough pipes 45 and 47. Any remaining methanol and glycerin is removed by passing the biodiesel through the resin exchange towers or vessels of the ion exchange units 60. Once the ion is exchanged, the biodiesel is passed through a final filtration unit 62, such as an EPA tier 3 and 4 specifications, through pipes 49. The finished biodiesel product is than transferred (using pipes 51) to one or more biodiesel storage tanks 64 and ready to be used as a fuel source according to ASTM standards.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A system for producing biodiesel using a multistep, continuous process comprising:
   a first holding tank configured for receiving and storing a precursor biodiesel feedstock, said first holding tank fluidly connected to at least one tank involved in acid esterification processing through a first stage of a continuous tubing system, said continuous tubing system comprising pipes configured to transport and subject said precursor biodiesel feedstock to a acid esterification process, a transesterification process, and a purification process as said feed stock is converted into a biodiesel, whereby said precursor biodiesel feedstock received and stored in said first holding tank is transported to said at least one acid esterification processing tank through said first stage of a continuous tubing system;
   at least one heating unit configured to heat said precursor biodiesel feedstock as it is transported from said first holding tank to said at least one tank involved in acid esterification processing; said at least one heating unit configured to heat said precursor biodiesel feedstock to a temperature of between 50 degrees Celsius and 60 degrees Celsius;
   at least one first acid esterification process treating tank fluidly connected to said first stage of said continuous tubing system and containing a fluid adapted for converting said precursor biodiesel feedstock into a biodiesel using an acid esterification process;
   at least one first sonochemical mixer adapted for producing ultrasonic energy prior to said precursor biodiesel feedstock entering said at least one acid esterification processing tank, said first sonochemical mixer having a valve for restricting fluid output to a constant low pressure of 2 to 3 atmospheres;
   at least one transesterification processing tank adapted for converting said precursor biodiesel feedstock into a biodiesel using a transesterification process, said at least one transesterification processing tank fluidly coupled to said at least one acid esterification processing tank through a second stage of said continuous tubing system;
   at least one second heating reservoir adapted to receive said precursor biodiesel feedstock as it is transferred from said at least one acid esterification processing tank to said at least one transesterification processing tank, said at least one second heating reservoir configured to heat said biodiesel feedstock to a temperature of between 50 degrees Celsius and 60 degrees Celsius;
   at least one second sonochemical mixer adapted for producing ultrasonic energy prior to said precursor biodiesel feedstock entering said at least one transesterification process processing tank, said second sonochemical mixer having a valve for restricting fluid output to a constant low pressure of 2 to 3 atmospheres;
   a centrifuge; and
   at least one purification unit adapted for purifying said precursor biodiesel feedstock into a biodiesel.

2. The system for producing biodiesel using a multistep, continuous process according to claim 1 wherein said first heating unit or said second heating unit is a hot water furnace.

3. The system for producing biodiesel using a multistep, continuous process according to claim 1 wherein said at least one first acid esterification process treating tank contains an acid.

4. The system for producing biodiesel using a multistep, continuous process according to claim 3 further including at least one second acid esterification process treating tank containing a fluid adapted for converting a precursor biodiesel feedstock into a biodiesel using an acid esterification process fluidly connected to said first stage of said continuous tubing system, said at least one second acid esterification process treating tank containing an alcohol.

5. The system for producing biodiesel using a multistep, continuous process according to claim 1 further including at least one catalyst storing tank storing a catalyst therein.

6. The system for producing biodiesel using a multistep, continuous process according to claim 5 wherein said at least one catalyst storing tank contains sodium hydroxide or potassium hydroxide methylate.

7. The system for producing biodiesel using a multistep, continuous process according to claim 1 further including an ion exchange unit.

8. A system for producing biodiesel using a multistep, continuous process comprising:
   a continuous tubing system comprising pipes configured to transport a precursor biodiesel feedstock while subjecting said precursor biodiesel feedstock to an acid esterification process, a transesterification process, and a purification process as said feed stock is converted into a biodiesel;
   a first holding tank configured for receiving and storing a precursor biodiesel feedstock, said first holding tank fluidly connected to at least one tank involved in acid esterification processing through a first stage of said continuous tubing system, whereby a said precursor biodiesel feedstock received and stored in said first holding tank is transported to said at least one acid esterification processing tank through said first stage of a continuous tubing system;
   at least one heating unit configured to heat said precursor biodiesel feedstock as it is transported from said first holding tank to said at least one tank involved in acid esterification processing; said at last one heating unit configured to heat said precursor biodiesel feedstock to a temperature of between 50 degrees Celsius and 60 degrees Celsius;
   at least one first acid esterification process treating tank fluidly connected to said first stage of said continuous tubing system and containing a fluid adapted for converting said precursor biodiesel feedstock into a biodiesel using an acid esterification process;
   at least one transesterification processing tank adapted for converting said precursor biodiesel feedstock into a biodiesel using a transesterification process, said at least one transesterification processing tank fluidly coupled to said at least one acid esterification processing tank through a second stage of said continuous tubing system;

at least one second heating reservoir adapted to receive said precursor biodiesel feedstock as it is transferred from said at least one acid esterification processing tank to said at least one transesterification processing tank, said at least one second heating reservoir configured to heat said biodiesel feedstock to a temperature of between 50 degrees Celsius and 60 degrees Celsius;

at least one purification unit adapted for purifying said precursor biodiesel feedstock into a biodiesel;

at least one first sonochemical mixing device placed at a position along said continuous tubing system prior to said precursor biodiesel feedstock entering said at least one acid esterification processing tank; and at least one second sonochemical mixing device placed at a position along said continuous tubing system prior to said precursor biodiesel feedstock entering said at least one transesterification processing tank.

9. The system for producing biodiesel using a multistep, continuous process according to claim 8 further including a centrifuge.

10. The system for producing biodiesel using a multistep, continuous process according to claim 8 wherein said at least one purification unit is an ion exchange device, a filtration unit, or combinations thereof.

* * * * *